(12) United States Patent
Reimchen

(10) Patent No.: US 10,364,853 B2
(45) Date of Patent: Jul. 30, 2019

(54) FREE-WHEELING DEVICE FOR AN AUTOMATIC GEARBOX

(71) Applicant: Schaeffler Technologies AG & Co. KG, Herzogenaurach (DE)

(72) Inventor: Alexander Reimchen, Herzogenaurach (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 46 days.

(21) Appl. No.: 15/548,483

(22) PCT Filed: Jan. 22, 2016

(86) PCT No.: PCT/DE2016/020027
§ 371 (c)(1),
(2) Date: Aug. 3, 2017

(87) PCT Pub. No.: WO2016/138896
PCT Pub. Date: Sep. 9, 2016

(65) Prior Publication Data
US 2018/0003246 A1    Jan. 4, 2018

(30) Foreign Application Priority Data

Mar. 5, 2015    (DE) .................. 10 2015 203 922

(51) Int. Cl.
*F16D 41/06*        (2006.01)
*F16D 41/067*       (2006.01)
(Continued)

(52) U.S. Cl.
CPC .......... *F16D 41/06* (2013.01); *C12N 15/8213* (2013.01); *F16D 41/064* (2013.01); *F16D 41/066* (2013.01); *F16D 41/067* (2013.01)

(58) Field of Classification Search
CPC ...... F16D 41/06; F16D 41/064; F16D 41/066; F16D 41/067; F16D 2300/12
See application file for complete search history.

(56) References Cited

U.S. PATENT DOCUMENTS 3,243,023 A    3/1966    Boyden
3,339,687 A    9/1967    Cowles
(Continued)

FOREIGN PATENT DOCUMENTS

CN    201953859 U    8/2011
DE      19750260 A1    5/1999
(Continued)

*Primary Examiner* — Stacey A Fluhart
(74) *Attorney, Agent, or Firm* — Reid A. Baldwin

(57) ABSTRACT

The disclosure relates to a free-wheeling device for an automatic gearbox, for example, of a motor vehicle. The device may include a rotatable inner ring and a stationary fixed outer ring, and a cage which is arranged radially between the inner ring and the outer ring for receiving clamping bodies. The outer ring may include at least a supporting ring and a securing ring which is arranged radially on an outer circumferential face of the supporting ring and connected rotationally fixedly to the supporting ring. The supporting ring may be provided to absorb tangential forces, and the securing ring may have a plurality of radial formations on an outer circumferential face for stationary fixing of the outer ring.

18 Claims, 1 Drawing Sheet

(51) Int. Cl.
*F16D 41/066* (2006.01)
*F16D 41/064* (2006.01)
*C12N 15/82* (2006.01)

(56) References Cited

U.S. PATENT DOCUMENTS

| | | | | |
|---|---|---|---|---|
| 5,433,305 A | * | 7/1995 | Takamatsu | F16D 41/067 192/110 B |
| 5,511,642 A | * | 4/1996 | Klotz | F16D 41/064 192/45.004 |
| 6,374,974 B1 | * | 4/2002 | Wake | F16D 41/067 192/45.008 |
| 2007/0034032 A1 | * | 2/2007 | Moore | F16D 11/10 74/339 |
| 2009/0057461 A1 | * | 3/2009 | Hayashi | F16D 41/067 242/247 |
| 2011/0271795 A1 | * | 11/2011 | Takada | F16D 41/066 74/810.1 |
| 2011/0315801 A1 | * | 12/2011 | Hayashi | A01K 89/0117 242/247 |
| 2013/0098732 A1 | * | 4/2013 | Ehinger | F16D 1/0858 192/41 R |
| 2013/0119212 A1 | * | 5/2013 | Benjamin | F16D 41/06 248/188.2 |
| 2014/0346000 A1 | * | 11/2014 | Chambonneau | F16D 41/064 192/45.004 |
| 2015/0013848 A1 | * | 1/2015 | Berruet | B23P 15/00 148/223 |

FOREIGN PATENT DOCUMENTS

| | | |
|---|---|---|
| DE | 19937437 A1 | 2/2001 |
| DE | 102009037255 A1 | 2/2011 |
| DE | 102010053358 A1 | 6/2012 |
| DE | 102011005049 A1 | 9/2012 |
| DE | 102013206811 A1 | 10/2014 |
| JP | 2009210024 A | 9/2009 |
| WO | 2010112367 A1 | 10/2010 |
| WO | 2011040334 A1 | 4/2011 |

* cited by examiner

FREE-WHEELING DEVICE FOR AN AUTOMATIC GEARBOX

CROSS-REFERENCE TO RELATED APPLICATIONS

This application is the U.S. National Phase of PCT Appln. No. PCT/DE2016/200027 filed Jan. 22, 2016, which claims priority to DE 102015203922.6 filed Mar. 5, 2015, the entire disclosures of which are incorporated by reference herein.

TECHNICAL FIELD

The disclosure concerns a free-wheeling device for an automatic gearbox, for example, of a motor vehicle.

BACKGROUND

Such free-wheeling devices are known for example from DE 10 2009 037 255 A1 and DE 10 2010 053 358 A1. Free-wheeling devices, in particular roller free-wheeling devices, may allow rotation in a defined direction while rotation in the other direction may be blocked by clamping rollers which clamp onto clamping ramps. The area of application of such free-wheeling devices extends in particular to conversion or automatic transmissions in the motor vehicle sector or in corresponding industrial machines.

The roller free-wheeling device described in DE 10 2009 037 255 A1 comprises a cylindrical outer ring with clamping ramps formed on the inner surface, several clamping rollers which are spring-loaded against the clamping ramps, and a cage which is arranged rotationally fixedly in the outer ring and on which the clamping rollers are received and springs are arranged at the cage webs which serve for spring-loading of the clamping rollers. The cage webs here extend between two cage rings.

In contrast, the clamping roller free-wheeling device known from DE 10 2010 053 358 A1 has an outer ring which is driven through a predefined angle via an eye of a connecting rod in order to transmit torque to the inner ring over this angular range in clamping operation of the clamping rollers, while on a return movement of the connecting rod, the clamping roller free-wheeling device is merely overrun in idle mode. Such an eye may however also serve for stationary fixing of the outer ring. Furthermore, it is also usual for the outer ring to have a structure or geometry on its outer circumferential face which serves to fix the outer ring stationary.

Thus, for example, free-wheeling devices are used in automatic gearboxes as supporting elements and return blocks in order to perform gear switching processes. Usually, the outer ring is fixed stationary in the housing, wherein—as previously explained—this has a geometry on its outer circumferential face. The outer rings are heavily loaded by tangential forces and therefore have a solid construction. Usually, the geometry on the outer circumferential face of the outer ring is produced by broaching, splicing or hobbing. Because of this method of forming the geometry on the outer circumferential face of the outer ring, production of the outer ring is relatively time- and cost-intensive. Other methods such as sintering or forging are less common because of additional resulting disadvantages.

SUMMARY

An object of the present disclosure is therefore to create a free-wheeling device optimized for production, which can be manufactured particularly simply, quickly and economically.

According to the disclosure, the outer ring may include at least a supporting ring and a securing ring which is arranged radially on an outer circumferential face of the supporting ring and connected rotationally fixedly to the supporting ring, wherein the supporting ring is provided to absorb tangential forces, and wherein the securing ring has a plurality of radial formations on an outer circumferential face for stationary fixing of the outer ring.

The separation of the supporting ring and securing ring, which are brought together and connected to each other rotationally fixedly to form the outer ring, may allow a particularly simple and rapid production of the outer ring. Furthermore, because of the different loads between the supporting ring and the securing ring, the dimensions of the two components can be optimized. The supporting ring may require a solid design because of the tangential forces which occur due to expansion on clamping of the free-wheeling device, whereas the securing ring is not exposed to tangential forces but may merely fulfil the function of twist prevention by stationary fixing, in particular to a housing. Thus the securing ring may be formed so as to be relatively flat and hence both compact and lightweight.

In one embodiment, the securing ring is formed as one piece and comprises two ring discs which are axially connected together via the plurality of radial formations. In other words, a recess is arranged axially between the two ring discs. The plurality of radial formations serves as axial bridges between the two ring discs. In this way, the securing ring is formed so as to be particularly lightweight.

In one example, the securing ring may be produced without cutting. In particular, the securing ring is produced by punching, bending and welding of a metal sheet. Furthermore, the securing ring may be connected to the supporting ring by substance bonding, such as by welding.

According to an embodiment, the outer ring has a ramp ring arranged radially on an inner circumferential face of the supporting ring for provision of a running surface for the clamping bodies, wherein the ramp ring is connected rotationally fixedly to the supporting ring. In this way, there may be no need to form ramps on the supporting ring to serve as running surfaces for the clamping bodies. The ramp ring may be made of a hardened material which is more wear-resistant than the supporting ring. Furthermore, the ramp ring—like the securing ring—is formed so as to be particularly flat and hence both compact and lightweight.

In one example, the ramp ring is produced without cutting. In particular, the ramp ring may be made from a rolled and welded metal sheet.

In another example, the ramp ring is case-hardened. This in may increase the wear resistance of the ramp ring. Because of the flat design of the ramp ring, case-hardening may be beneficial.

The disclosure includes the technical teaching that the ramp ring may be connected to the supporting ring by interference fit. In one example, the ramp ring is pressed into the supporting ring.

BRIEF DESCRIPTION OF THE DRAWINGS

Further measures improving the disclosure are described in more detail below together with the description of example embodiments of the disclosure with reference to the figures. The drawings show.

DETAILED DESCRIPTION

Figure 1:
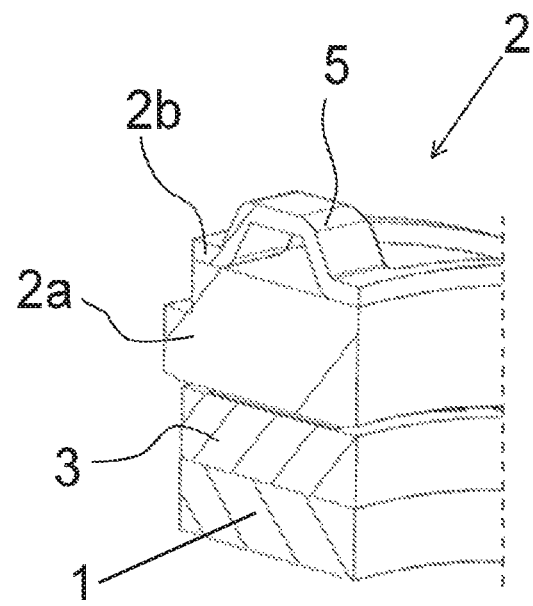
FIG. 1 is a diagrammatic sectional view to illustrate the structure of a free-wheeling device according to the disclosure, comprising an outer ring formed from a supporting ring and a securing ring.

According to FIG. 1, a free-wheeling device according to the disclosure for an automatic gearbox of a motor vehicle has a rotatable inner ring 1 and a stationary fixed outer ring 2, and a cage 3 arranged radially between the inner ring 1 and the outer ring 2 for receiving clamping bodies (not shown here). The outer ring 2 consists of a supporting ring 2a and a securing ring 2b which is arranged radially on an outer circumferential face of the supporting ring 2a and connected rotationally fixedly to the supporting ring 2a. Here, the supporting ring 2a is provided to receive tangential forces. In contrast, the securing ring 2b has a plurality of radial formations 5 arranged on an outer circumferential face for stationary fixing of the outer ring 2.

The supporting ring 2a and the securing ring 2b may be connected together by substance bonding, in such as by welding. Furthermore, the securing ring 2b may be produced without cutting, in particular by punching, bending and welding of a metal sheet. In contrast, the supporting ring 2a may be formed solidly and may be made of a hardenable steel material. In particular, a forged blank may be suitable for production of the supporting ring 2a. A running surface for the clamping bodies is provided on an inner circumferential face of the supporting ring 2a. To increase the wear resistance, the supporting ring 2a, or at least the running surface for the clamping bodies on the supporting ring 2a, may be hardened.

Figure 2:
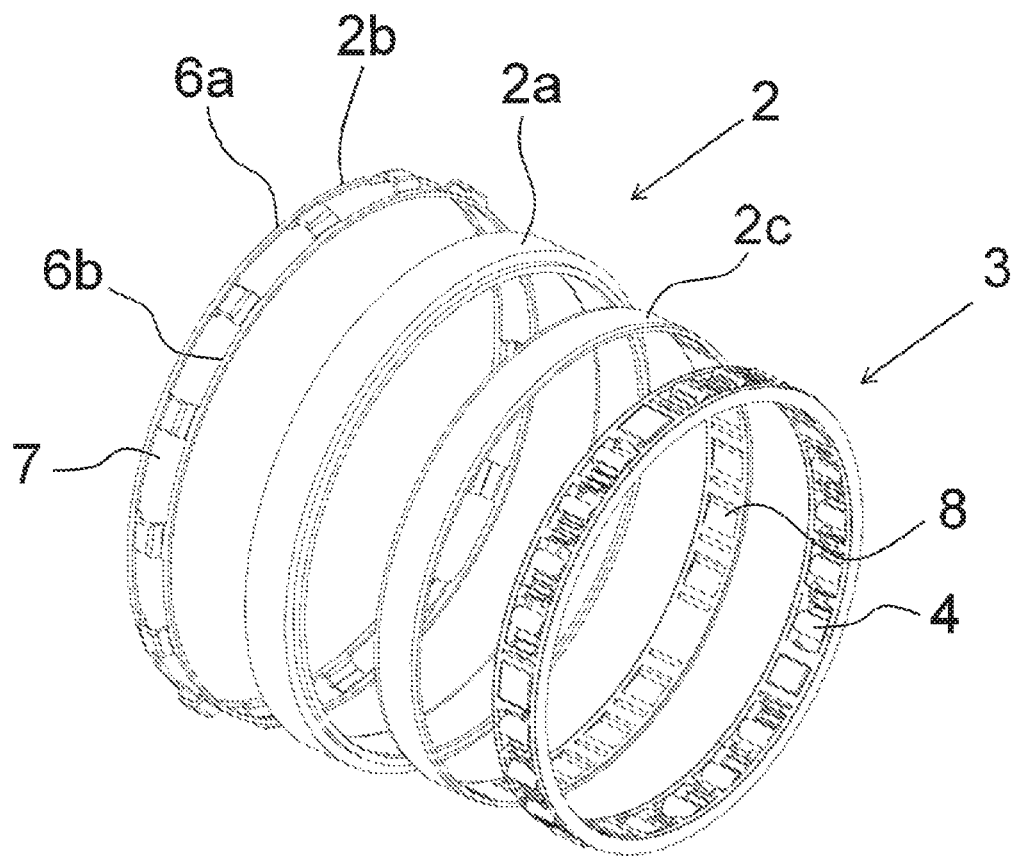
FIG. 2 is a diagrammatic exploded view to illustrate the structure of a free-wheeling device according to the disclosure, comprising an outer ring formed from a supporting ring, a securing ring and a ramp ring.

According to FIG. 2, the outer ring 2 may include a supporting ring 2a, a securing ring 2b and a ramp ring 2c. The securing ring 2b is here arranged radially on an outer circumferential face of the supporting ring 2a and connected rotationally fixedly to the supporting ring 2a. Furthermore, the ramp ring 2c is arranged radially on an inner circumferential face of the supporting ring 2a and connected rotationally fixedly to the supporting ring 2a. For each clamping body 4 arranged in the cage 3, a respective ramp 8 is formed on an inner circumferential face of the ramp ring 2c and serves as a running surface for the respective clamping body 4. Furthermore, the ramp ring 2c may be produced without cutting, may be case-hardened and may be connected to the supporting ring 2a by interference fit, such as by a press joint. Furthermore, the securing ring 2b may be formed as one piece and comprises two ring discs 6a, 6b which are axially connected together via the plurality of radial formations 5. Thus a recess 7 is arranged axially between the two ring discs 6a, 6b, wherein the radial formations 5 serve as axial bridges between the two ring discs 6a, 6b and are provided for stationary fixing of the outer ring 2.

LIST OF REFERENCE NUMERALS

1 Inner ring
2 Outer ring
2a Supporting ring
2b Securing ring
2c Ramp ring
3 Cage
4 Clamping body
5 Radial formation
6a, 6b Ring disc
7 Recess
8 Ramp

The invention claimed is:

1. A free-wheeling device for an automatic gearbox of a motor vehicle, comprising a rotatable inner ring and a stationary fixed outer ring, and a cage which is arranged radially between the inner ring and the outer ring for receiving clamping bodies, wherein the outer ring includes at least a supporting ring and a securing ring which is arranged radially on an outer circumferential face of the supporting ring and connected rotationally fixedly to the supporting ring, the supporting ring being configured to absorb tangential forces, wherein the securing ring has a plurality of radial formations on an outer circumferential face for stationary fixing of the outer ring, and wherein the securing ring is formed as one piece and comprises two ring discs which are axially connected together via the plurality of radial formations.

2. The free-wheeling device as claimed in claim 1, wherein the securing ring is produced without cutting.

3. The free-wheeling device as claimed in claim 2, wherein the securing ring is produced by punching, bending and welding of a metal sheet.

4. The free-wheeling device as claimed in claim 1, wherein the securing ring is connected to the supporting ring by substance bonding.

5. The free-wheeling device as claimed in claim 1, wherein the outer ring has a ramp ring arranged radially on an inner circumferential face of the supporting ring for provision of a running surface for the clamping bodies, wherein the ramp ring is connected rotationally fixedly to the supporting ring.

6. The free-wheeling device as claimed in claim 5, wherein the ramp ring is produced without cutting.

7. The free-wheeling device as claimed in claim 5, wherein the ramp ring is connected to the supporting ring by an interference fit.

8. A free-wheeling device for an automatic gearbox, comprising:
   a rotatable inner ring;
   a fixed outer ring; and
   a cage arranged radially between the inner ring and the outer ring and configured to receive clamping bodies;
   wherein:
   the outer ring including at least a supporting ring and a securing ring, the securing ring arranged radially on an outer circumferential face of the supporting ring and connected rotationally fixedly to the supporting ring;
   the supporting ring being configured to absorb tangential forces;
   the securing ring having a plurality of radial formations on an outer circumferential face for fixing of the outer ring; and
   the securing ring is formed as one piece and comprises two ring discs which are axially connected together via the plurality of radial formations.

9. The free-wheeling device as claimed in claim 8, wherein the securing ring is connected to the supporting ring by substance bonding.

10. The free-wheeling device as claimed in claim 8, wherein the outer ring has a ramp ring arranged radially on an inner circumferential face of the supporting ring for provision of a running surface for the clamping bodies, wherein the ramp ring is connected rotationally fixedly to the supporting ring.

11. The free-wheeling device as claimed in claim 10, wherein the ramp ring is connected to the supporting ring by an interference fit.

12. A free-wheeling device for an automatic gearbox of a motor vehicle, comprising a rotatable inner ring and a stationary fixed outer ring, and a cage which is arranged radially between the inner ring and the outer ring for receiving clamping bodies, wherein the outer ring includes at least a supporting ring and a securing ring which is arranged radially on an outer circumferential face of the supporting ring and connected rotationally fixedly to the supporting ring, the supporting ring being configured to absorb tangential forces, wherein the securing ring has a plurality of radial formations on an outer circumferential face for stationary fixing of the outer ring, and wherein the securing ring is produced by punching, bending and welding of a metal sheet.

13. The free-wheeling device as claimed in claim 12, wherein the securing ring is formed as one piece and comprises two ring discs which are axially connected together via the plurality of radial formations.

14. The free-wheeling device as claimed in claim 12, wherein the securing ring is produced without cutting.

15. The free-wheeling device as claimed in claim 12, wherein the securing ring is connected to the supporting ring by substance bonding.

16. The free-wheeling device as claimed in claim 12, wherein the outer ring has a ramp ring arranged radially on an inner circumferential face of the supporting ring for provision of a running surface for the clamping bodies, wherein the ramp ring is connected rotationally fixedly to the supporting ring.

17. The free-wheeling device as claimed in claim 16, wherein the ramp ring is produced without cutting.

18. The free-wheeling device as claimed in claim 16, wherein the ramp ring is connected to the supporting ring by an interference fit.

* * * * *